(«12») United States Patent
Choi et al.

(10) Patent No.: US 9,072,103 B2
(45) Date of Patent: Jun. 30, 2015

(54) COGNITIVE INTER-CELL INTERFERENCE CONTROL METHOD AND APPARATUS

(75) Inventors: Hyun Ho Choi, Suwon-si (KR); Chang Yong Shin, Seoul (KR); Kyung Hun Jang, Suwon-si (KR); Won Jong Noh, Yongin-si (KR); Won Jae Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1163 days.

(21) Appl. No.: 13/034,585

(22) Filed: Feb. 24, 2011

(65) Prior Publication Data

US 2011/0305293 A1 Dec. 15, 2011

(30) Foreign Application Priority Data

Jun. 14, 2010 (KR) ........................ 10-2010-0056119

(51) Int. Cl.
*H04B 17/00* (2006.01)
*H04W 72/08* (2009.01)
*H04W 72/04* (2009.01)
*H04W 92/20* (2009.01)

(52) U.S. Cl.
CPC ........ *H04W 72/082* (2013.01); *H04W 72/0406* (2013.01); *H04W 92/20* (2013.01)

(58) Field of Classification Search
USPC .................. 455/67.11, 63.1, 67.13, 450–455; 370/310–320
See application file for complete search history.

(56) References Cited

U.S. PATENT DOCUMENTS

| | | | |
|---|---|---|---|
| 8,615,199 B2 * | 12/2013 | Han et al. ...................... 455/63.1 |
| 2002/0150187 A1 | 10/2002 | Chugg et al. |
| 2005/0095985 A1 | 5/2005 | Hafeoz et al. |
| 2006/0014554 A1 * | 1/2006 | Gerlach ........................ 455/501 |
| 2007/0280170 A1 | 12/2007 | Kawasaki |
| 2008/0063122 A1 | 3/2008 | Jong et al. |
| 2010/0279619 A1 * | 11/2010 | Yeh et al. ...................... 455/63.1 |
| 2011/0244899 A1 * | 10/2011 | Li et al. ........................ 455/501 |
| 2011/0310786 A1 * | 12/2011 | Qin et al. ...................... 370/312 |
| 2013/0039194 A1 * | 2/2013 | Siomina et al. ............... 370/252 |

FOREIGN PATENT DOCUMENTS

| | | |
|---|---|---|
| KR | 10-2002-0095024 | 12/2002 |
| KR | 10-2009-0021630 | 3/2009 |
| KR | 10-2009-0060701 | 6/2009 |
| KR | 10-2009-0083365 | 8/2009 |
| KR | 10-2009-0094752 A | 9/2009 |
| KR | 10-2010-0050928 A | 5/2010 |

OTHER PUBLICATIONS

International Search Report issued on Feb. 15, 2012 in counterpart International Patent Application No. PCT/KR2011/003995 (3 pages, in English).

* cited by examiner

*Primary Examiner* — Fayyaz Alam
(74) *Attorney, Agent, or Firm* — NSIP Law

(57) ABSTRACT

Provided is a cognitive inter-cell interference control method and apparatus. Inter-cell interference may be measured based on various methods in order to recognize an interference channel, and an appropriate interference control algorithm may be applied to the interference channel by modeling based on overhead. Accordingly, interference may be controlled.

9 Claims, 10 Drawing Sheets

COGNITIVE INTER-CELL INTERFERENCE CONTROL METHOD AND APPARATUS

CROSS-REFERENCE TO RELATED APPLICATION(S)

This application claims the benefit under 35 U.S.C. §119 (a) of Korean Patent Application No. 10-2010-0056119, filed on Jun. 14, 2010, in the Korean Intellectual Property Office, the entire disclosure of which is incorporated herein by reference for all purposes.

BACKGROUND

1. Field

The following description relates to a method and apparatus for controlling interference in a multi-cell communication system.

2. Description of Related Art

Inter-cell interference that may occur in a cellular system may decrease a wireless data transmission rate within the system. For example, inter-cell interference may occur between cells that use the same frequency, and various interference conditions may occur as various cell structures are formed. As a result, a cellular system may determine a frequency reuse rate as '1' due to a lack of a frequency resource. Therefore, increasing the transmission speed under the interference condition is important.

Inter-layer cell interference may occur in small cells, for example, a picocell and a femtocell, which are hierarchically established in a macrocell. Accordingly, there is a desire to reduce or control interference in multi-cell communication systems.

SUMMARY

In one general aspect, there is provided a communication method for a target base station in a target cell in a multi-cell communication system including the target cell and a neighbor cell, the method comprising receiving, from at least one terminal in the target cell, information associated with interference from a neighbor terminal in the neighbor cell to the at least one terminal in the target cell, and location information of the at least one terminal, predicting interference from the target base station to the neighbor terminal based on the received information associated with the interference from the neighbor terminal to the at least one terminal and based on the location information of the at least one terminal, and performing interference control based on the predicted interference from the target base station to the neighbor terminal The information associated with the interference from the neighbor terminal to the at least one terminal may include at least one of a received signal strength (RSS) and an interference-to-noise-ratio (INR).

The method may further comprise determining a cooperative level between a neighbor base station in the neighbor cell and the target base station based on at least one of information associated with an available bandwidth, a data transmission rate, a delay, and a jitter between the neighbor base station and the target base station.

The performing of the interference control may comprise selecting, based on an overhead, a method to be used for the interference control from among methods including at least one of a user scheduling scheme, a cooperation scheme between base stations, and a multiple-input multiple-output (MIMO) scheme.

The method may further comprise removing interference through an interference control algorithm based on the selected method.

In another aspect, there is provided a communication method for a target base station in a target cell in a multi-cell communication system including the target cell and a neighbor cell, the method comprising measuring interference from a neighbor terminal in the neighbor cell to the target base station, requesting pilot transmission to enable the neighbor terminal to transmit a pilot signal to the target base station, based on the measured interference from the neighbor terminal to the target base station, receiving the pilot signal from the target terminal, and estimating an interference channel from the neighbor terminal to the target base station based on the pilot signal.

The requesting may comprise transmitting, to the neighbor base station, a message requesting a neighbor base station to command the neighbor terminal to transmit the pilot signal to the target base station.

The method may further comprise receiving, from the neighbor base station, information associated with a pattern of the pilot signal or information associated with a resource to be used for transmitting the pilot signal.

The requesting may comprise transmitting, to the neighbor terminal, a message requesting the pilot transmission.

The transmitting may comprise transmitting the message requesting the pilot transmission using a predetermined downlink common control channel.

The receiving may comprise receiving the pilot signal transmitted by the neighbor terminal using a predetermined uplink common pilot channel.

In another aspect, there is provided a communication method for a target terminal in a target cell in a multi-cell communication system including the target cell and a neighbor cell, the method comprising measuring interference from a neighbor terminal in the neighbor cell to the target terminal, and transmitting, to the target base station, information associated with the measured interference and location information of the target terminal, using an uplink resource of the target terminal The measuring may comprise measuring the interference when the target terminal does not perform uplink transmission in an uplink channel of the target terminal.

The measuring may comprise measuring at least one of an RSS and an INR.

The measuring may comprise receiving a pilot signal from the neighbor terminal in the neighbor cell and estimating channel state information (CSI) from the neighbor terminal to the target terminal.

The method may further comprise determining a cooperative level between the target terminal and the neighbor terminal In another aspect, there is provided a communication method for a terminal in a target cell in a multi-cell communication system including the target cell and a neighbor cell, the method comprising receiving a call for pilot transmission to a neighbor base station, and transmitting a pilot signal to the neighbor base station.

The receiving may comprise receiving, from a target base station, a message commanding pilot transmission to the neighbor base station.

The receiving may comprise receiving, from the neighbor base station, a message requesting the pilot transmission.

The receiving may comprise receiving, from the neighbor base station, the message requesting pilot transmission using a predetermined downlink common control channel.

The transmitting may comprise transmitting the pilot signal to the neighbor base station, using a predetermined uplink common pilot channel.

Other features and aspects may be apparent from the following detailed description, the drawings, and the claims.

Figure 1:
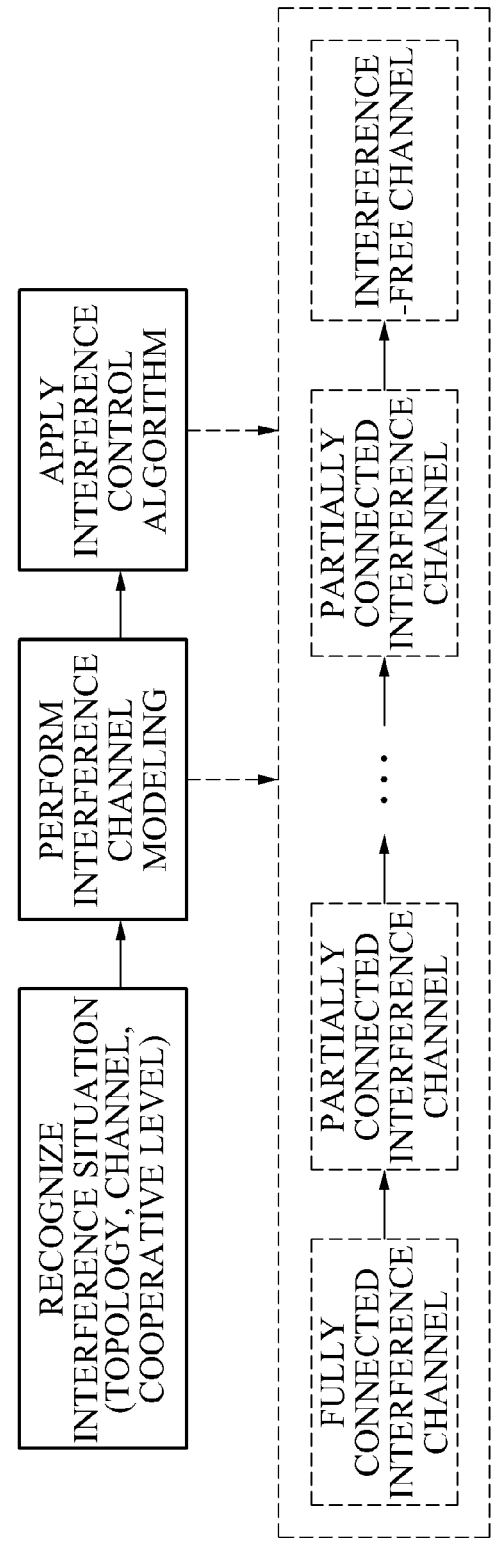
FIG. 1 is a diagram illustrating an example of cognitive inter-cell interference control.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Examples described herein recognize and control inter-cell interference occurring in various forms in a multi-cell communication system, enabling a reception end to receive data without or with a reduced amount of interference and increasing a capacity of a multi-cell communication system.

FIG. 1 illustrates an example of cognitive inter-cell interference control. Referring to FIG. 1, a cognitive inter-cell interference controlling method may include: 1) recognizing an interference condition, such as a topology, a channel, a cooperative level, and the like, 2) interference channel modeling to select a method for transforming a current interference channel model into a simplified interference channel model, and 3) applying an optimal interference control algorithm based on the selected method.

The interference condition may be recognized based on a current communication environment, for example, based on a received signal strength (RSS), an interference-to-noise-ratio (INR), channel state information (CSI), a cooperative level between base stations and/or between terminals, information associated with an existence of a neighbor terminal, and the like.

The interference channel modeling may select a method to transform an interference channel model for the current communication environment into an interference channel model causing relatively weak interference, based on information determined in the operation of recognizing the interference condition. For example, the interference channel modeling may determine a method, or a number of methods, for transforming a fully connected interference channel into a partially connected interference channel. Examples of the method may include a scheduling scheme, cooperation between nodes, a multiple-input multiple-output (MIMO) scheme, and the like.

Applying the interference control algorithm may cancel or reduce interference, for example, by generating a transmission beamforming vector or a reception beamforming vector using an interference control algorithm that is based on the method selected from the operation of interference channel modeling. Examples of the interference control algorithm may include a dynamic spectrum management (DSM) scheme, a coordinated scheduling scheme, a coordinated beamforming (CB) scheme, a joint processing (JP) scheme, and the like.

The recognizing of the interference may be performed by a base station and a terminal, and the interference channel modeling may be performed by the base station. Applying the interference control algorithm may be performed by the base station or the terminal.

Figure 2:
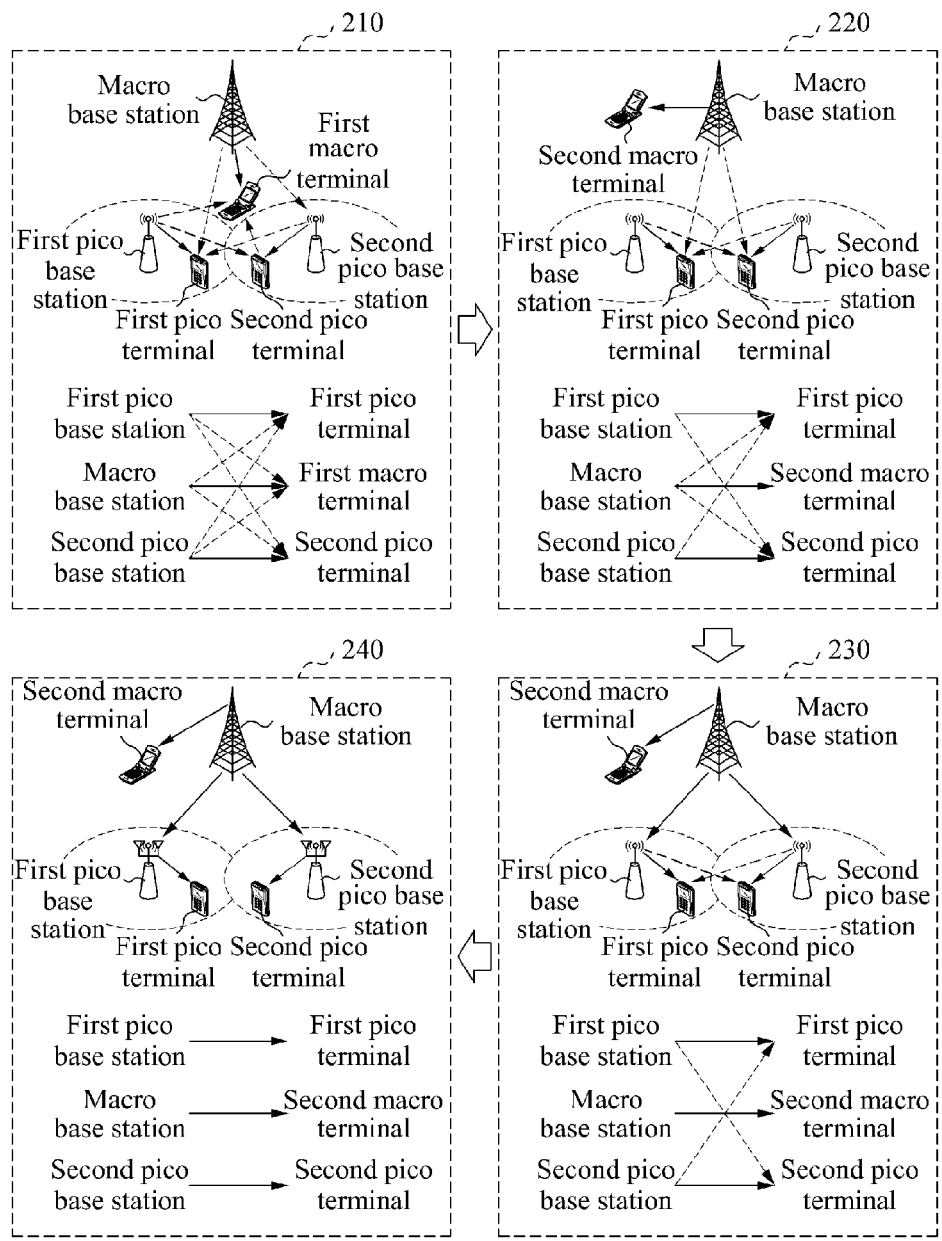
FIG. 2 is a diagram illustrating an example of a process of interference channel modeling.

FIG. 2 illustrates an example of a process of interference channel modeling.

Referring to FIG. 2, a scheduling scheme, a cooperation scheme, and a MIMO scheme may be used to transform a recognized interference channel model for a current communication environment into a simplified interference channel model. An example of the modeling with respect to the interference channel model may be performed as described herein.

In this example, region 210 represents an interference channel model recognized by an operation of recognizing an interference condition. The region 210 includes a macro base station included in a macrocell, a first pico base station included in a first picocell, and a second pico base station included in a second picocell. In this example, the region 210 also includes a first macro terminal being served by the macro base station, a first pico terminal being served by the first pico base station, and a second pico terminal being served by the second pico base station. In region 210, interference between the macrocell and the first picocell, interference between the macrocell and the second picocell, and interference between the first picocell and the second picocell may occur.

Region 220 represents an example in which the scheduling scheme is applied to the interference channel model of region 210. For example, when the macro base station may select a second macro terminal that is farther away from the first picocell and the second picocell, and interference to the second macro terminal caused by the first picocell and the second picocell may be cancelled or reduced.

Region 230 represents an example in which the cooperation scheme between base stations is applied to the interference channel model of region 220. For example, transmission data information may be shared among base stations, and thus, the macro base station may be aware of transmission data information of the first pico base station and the second pico base station. In this example, interference to the first pico terminal and the second pico terminal from the macro base station may be cancelled or reduced.

Region 240 represents an example in which the MIMO scheme is applied to the interference channel model of region 230. When the first pico base station and the second pico base station use the MIMO scheme, interference to the second pico terminal from the first pico base station and interference to the first pico terminal from the second pico base station may be cancelled or reduced.

Accordingly, three pairs of nodes may transmit and receive data without interference or with a reduced amount of interference through three peer-to-peer channels as shown in region 240.

Schemes for recognizing interference or an interference condition may include a terminal-based interference condition cognition scheme in which a terminal measures interference from a neighbor cell and a base station-based interference condition cognition scheme where a base station measures interference from the neighbor cell.

<Terminal-based interference condition cognition scheme>

Figure 3:
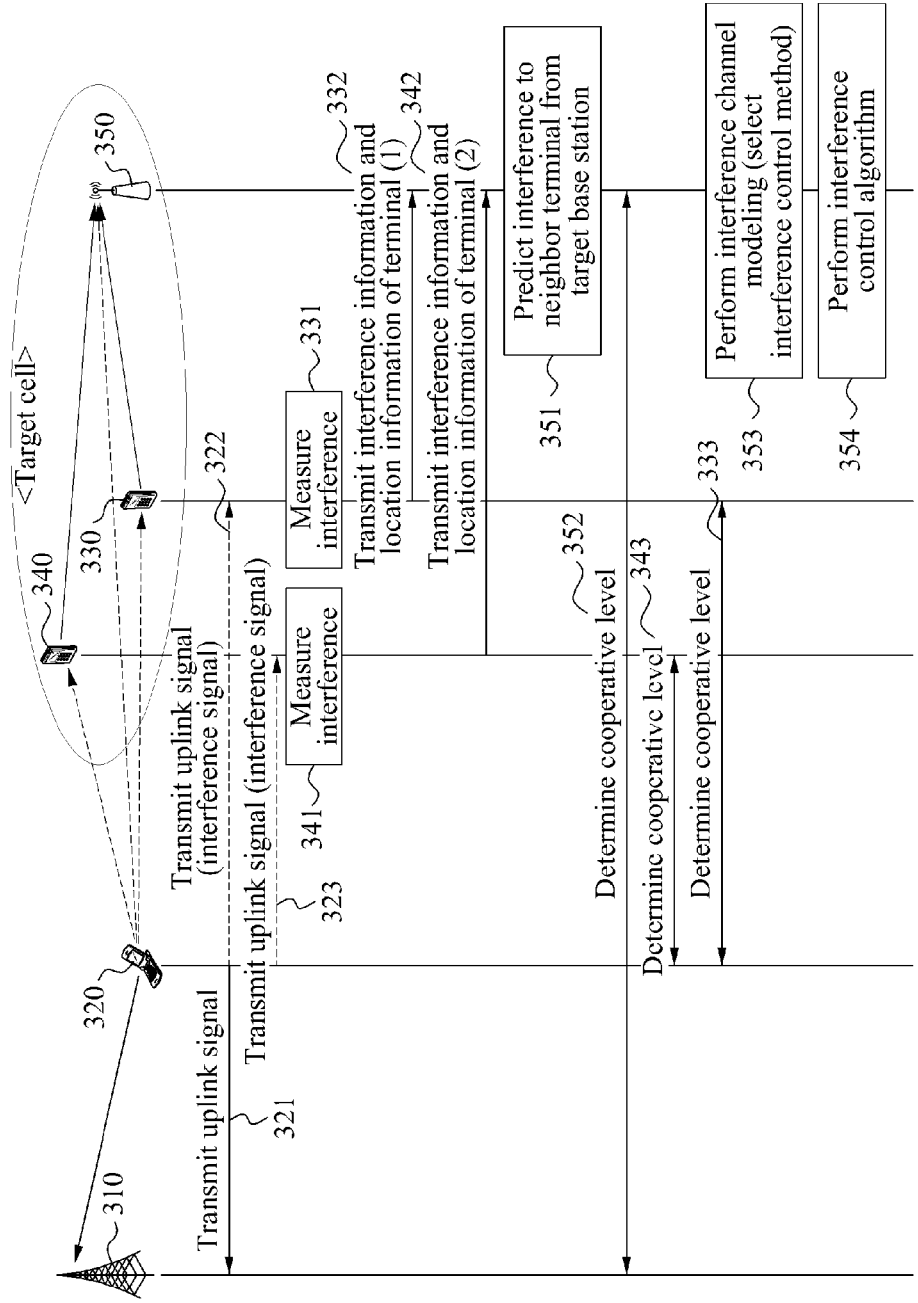
FIG. 3 is a flowchart illustrating an example of a method of recognizing an interference condition based on a terminal.

FIG. 3 illustrates an example of a method of recognizing an interference condition based on a terminal According to the terminal-based interference condition cognition scheme, at least one terminal may measure interference based on whether a neighbor terminal included in a neighbor cell exists. For example, this scheme may be used when a base station has difficulty in recognizing an interference signal of the neighbor terminal included in the neighbor cell.

Referring to FIG. 3, a target base station 350, a target terminal (1) 330, and a target terminal (2) 340 are included in a target cell, and a neighbor base station 310 and a neighbor terminal 320 are included in a neighbor cell. For example, the target terminal (1) 330 and the target terminal (2) 340 may exist in an edge of the target cell.

In 321, the neighbor terminal 320 transmits an uplink signal to the neighbor base station 310. For example, the uplink signal transmitted by the neighbor terminal 320 may be transmitted to the target terminal (1) 330 and/or to the target terminal (2) 340, in addition to the neighbor base station 310. The interference to the target terminal (1) 330 and the target terminal (2) 340 is represented by 322 and 323, respectively. As a result, the uplink signal transmitted by the neighbor terminal 320 may cause interference to the target terminal (1) 330 and to the target terminal (2) 340.

The target terminal (1) 330 and the target terminal (2) 340 may measure interference from the neighbor terminal 320. For example, the target terminal (1) 330 and the target terminal (2) 340 may periodically or aperiodically detect whether the neighbor terminal 320 exists, using an uplink channel, when the target terminal (1) 330 and the target terminal (2) 340 do not perform the uplink transmission. When interference is greater than or equal to a predetermined threshold, the target terminal (1) 330 and the target terminal (2) 340 may measure at least one of an RSS and an INR, with respect to the interference. When a pilot signal is transmitted from the neighbor terminal 320, the target terminal (1) 330 and the target terminal (2) 340 may also estimate CSI from the neighbor terminal 320 to the target terminal (1) 330 and to the target terminal (2) 340. In this example, the target terminal (1) 330 and the target terminal (2) 340 may measure the interference from the neighbor terminal 320 in 331 and 341, respectively. For example, the target terminal (1) 330 and the target terminal (2) 340 may simultaneously measure the interference.

The target terminal (1) 330 and the target terminal (2) 340 may transmit information associated with the measured interference and corresponding location information to the target base station 350 in 332 and 342, respectively. In this example, the target terminal (1) 330 and the target terminal (2) 340 may transmit the information using a corresponding uplink resource.

The target base station 350 may recognize the existence of the neighbor terminal 320 based on the corresponding location information and the information associated with the interference received from the target terminal (1) 330 and the target terminal (2) 340. The target base station 350 may predict interference to the neighbor terminal 320 from the target base station 350, in 351. For example, the predicted interference may be long-term channel information between the neighbor terminal 320 and the target base station 350.

A cooperative level between the target base station 350 and the neighbor base station 310 may be determined, in 352. The target terminal (1) 330 and the target terminal (2) 340 may determine a cooperative level with the neighbor terminal 320 in 333 and 343, respectively.

After the terminal-based interference condition cognition is performed, the base station may perform interference control. For example, the target base station 350 may perform interference channel modeling, in 353. During the interference channel modeling, a method for interference control may be selected based on the recognized interference condition. Accordingly, interference may be cancelled or reduced through an interference control algorithm based on the selected method, in 354.

<Base station-based interference condition cognition scheme>

In the example of the base station-based interference cognition scheme, a base station may directly recognize whether a neighbor terminal included in a neighbor cell exists, and estimate channel information between the neighbor terminal and the base station. For example, the estimation of the channel information may be performed in a short-term. The base station-based interference condition cognition scheme may be classified into two schemes based on a target from which a pilot transmission is requested. For example, the two schemes may include a scheme requesting the pilot transmission from a neighbor base station in the neighbor cell and a scheme requesting the pilot transmission from the neighbor terminal in the neighbor cell.

Figure 4:
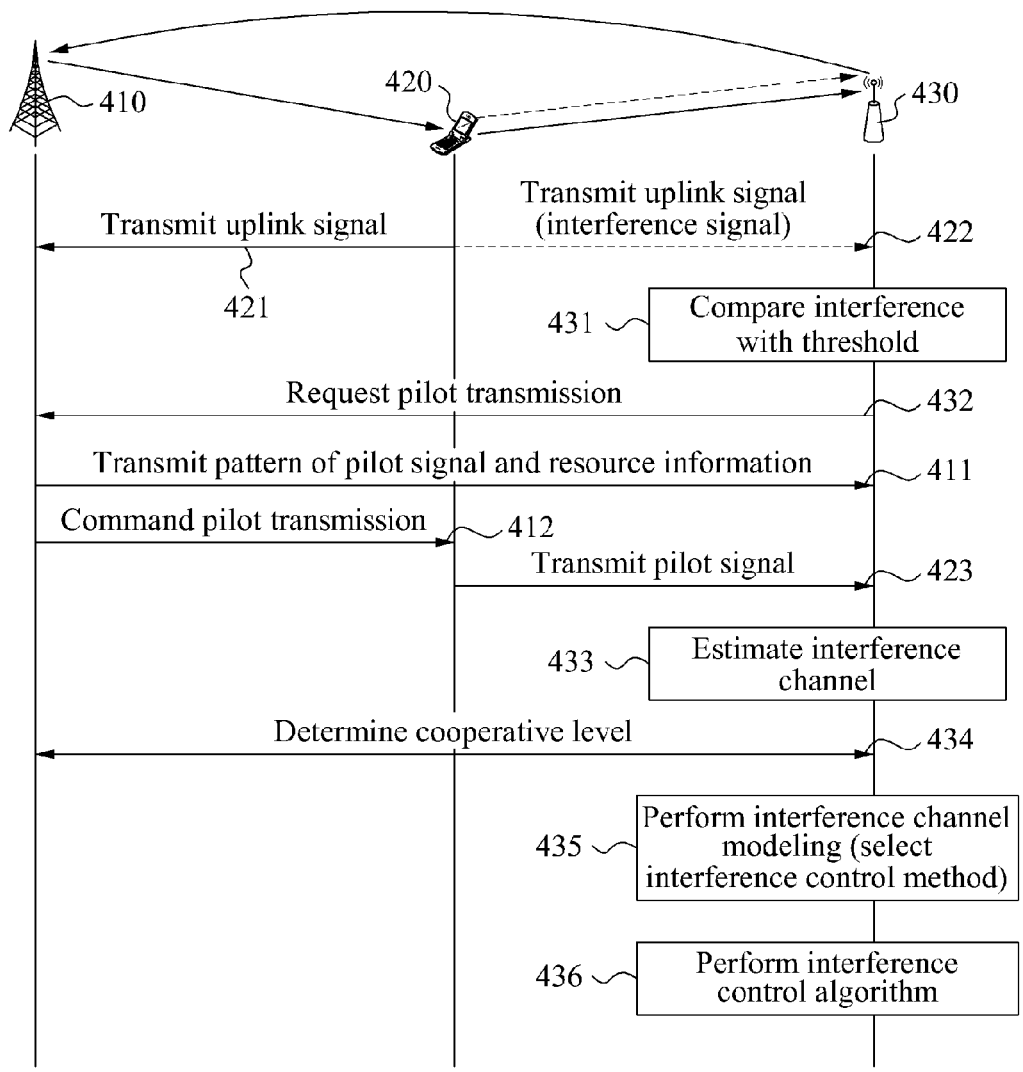
FIG. 4 is a flowchart illustrating an example of a method of requesting pilot transmission from a neighbor base station in a neighbor cell.

FIG. 4 illustrates an example of a method of requesting a pilot transmission from a neighbor base station in a neighbor cell.

Referring to FIG. 4, a target base station 430 is included in a target cell, and a neighbor base station 410 and a neighbor terminal 420 are included in a neighbor cell.

In 421, the neighbor terminal 420 transmits an uplink signal to the neighbor base station 410. For example, in 422 the uplink signal transmitted by the neighbor terminal 420 may be transmitted to the target base station 430 in addition to the neighbor base station 410. The uplink signal transmitted by the neighbor terminal 420 may cause interference to the target base station 430.

In 431, the target base station 430 measures interference from the neighbor terminal 420 and compares the measured interference with a predetermined threshold.

When the measured interference is greater than or equal to the predetermined threshold, in 432 the target base station 430 transmits, to the neighbor base station 410, a message requesting the neighbor base station 410 to command the neighbor terminal 420 to transmit a pilot signal to the target base station 430.

In this example, in 411 the neighbor base station 410 feeds back, to the target base station 430, a pattern of the pilot signal to be transmitted to the target base station 430 and information associated with resource, for example, a predetermined time and a predetermined frequency, to be used for the pilot transmission.

In 412, the neighbor base station 410 commands the neighbor terminal 420 to transmit the pilot signal.

The neighbor terminal 420 transmits, to the target base station 430, the pilot signal based on the pattern of the pilot signal and the resource to be used for the pilot transmission, in 423.

When the target base station 430 receives the pilot signal, in 433 the target base station 430 estimates a channel between the neighbor terminal 420 and the target base station 430. The target base station 430 may determine a cooperative level with the neighbor base station 410. Although not illustrated, a target terminal included in the target cell may also perform a process of determining a cooperative level with the neighbor terminal 420.

After the base station-based interference condition cognition scheme is performed, the base station may perform interference control. As described above, the target base station 430 performs interference channel modeling in 435, and cancels or reduces interference through an interference control algorithm based on a result of the modeling in 436.

Figure 5:
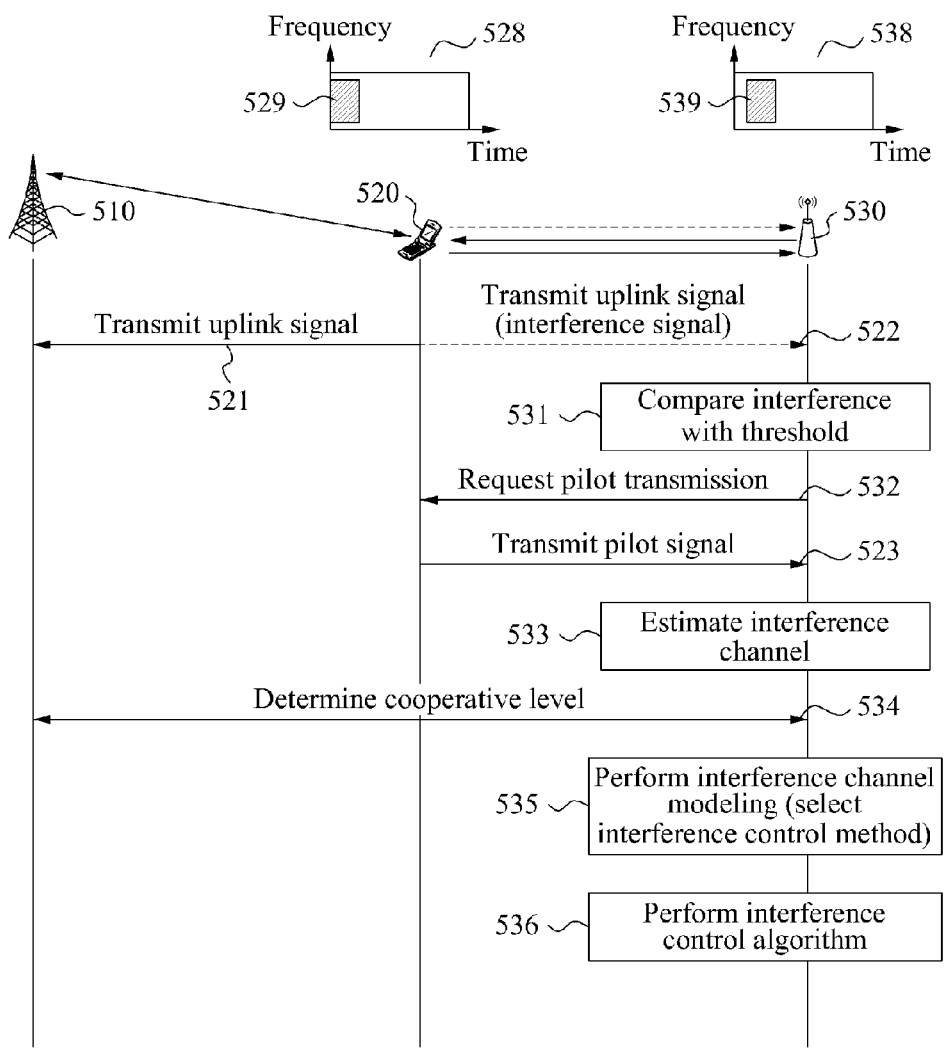
FIG. 5 is a flowchart illustrating an example of a method of requesting pilot transmission from a neighbor terminal in a neighbor cell.

FIG. 5 illustrates an example of a method of requesting a pilot transmission from a neighbor terminal in a neighbor cell.

Referring to FIG. 5, a target base station 530 is included in a target cell, and a neighbor base station 510 and a neighbor terminal 520 are included in a neighbor cell.

The neighbor terminal 520 transmits an uplink signal to the neighbor base station 510, in 521. In this example, an uplink signal transmitted by the neighbor terminal 520 is transmitted to the target base station 530 in addition to the neighbor base station 510, in 522. The uplink signal transmitted by the neighbor terminal 520 may cause interference to the target base station 530.

The target base station 530 measures interference from the neighbor terminal 520 and compares the measured interference with a predetermined threshold, in 531.

When the measured interference is greater than or equal to the predetermined threshold, in 532 the target base station 530 requests a pilot transmission from the neighbor terminal 520. In this example, the target base station 530 may transmit a message requesting the pilot transmission based on a predetermined downlink common control channel used.

For example, a graph 538 may represent a downlink common control channel used by the target base station 530. A region 539 of the downlink common control channel may be predefined as a region for requesting the pilot transmission. Both the target base station 530 and the neighbor terminal 520 may be aware that the predetermined region 539 is the region for a message requesting the pilot transmission. Accordingly, the target base station 530 may transmit, to the neighbor terminal 520, the message requesting the pilot transmission, based on a resource of the predetermined region 539.

The neighbor terminal 520 may decode the predetermined region 539 to determine whether the pilot transmission is requested by the target base station 530.

When the neighbor terminal 520 determines that the pilot transmission is requested, the neighbor terminal 520 transmits a pilot signal to the target base station 530, in 523. In this example, the neighbor terminal 520 may transmit the pilot signal to the target base station 530 based on a predetermined uplink common pilot channel.

For example, a graph 528 may represent a channel used by the neighbor terminal 520 for the uplink transmission. A region 529 of the channel used for the uplink transmission may be predetermined as a region for an uplink common pilot channel for the pilot transmission. Both the target base station 530 and the neighbor terminal 520 may be aware that the predetermined region 529 is the uplink common pilot channel. Accordingly, the neighbor terminal 520 may transmit the pilot signal to the target base station 530 based on a resource of the predetermined region 529.

When the target base station 530 receives the pilot signal, the target base station 530 may decode the uplink common pilot channel to estimate a channel between the neighbor terminal 520 and the target base station 530, in 533. The target base station 530 may determine a cooperative level with the neighbor base station 510, in 534. Although not illustrated in this example, a target terminal included in the target cell may perform a process of determining a cooperative level with the neighbor terminal 520.

After the base station-based interference condition cognition scheme is performed, the base station may perform interference control. In 535 the target base station 530 performs interference channel modeling, and in 536 the target base station 530 cancels or reduces interference through an interference control algorithm based on a result of the modeling.

The cooperative level may indicate whether data, or a channel, is to be shared between base stations based on a connection state between the base stations, and may indicate whether base stations are shared with each other or whether only one of the base stations is shared, and the like.

Figure 6:
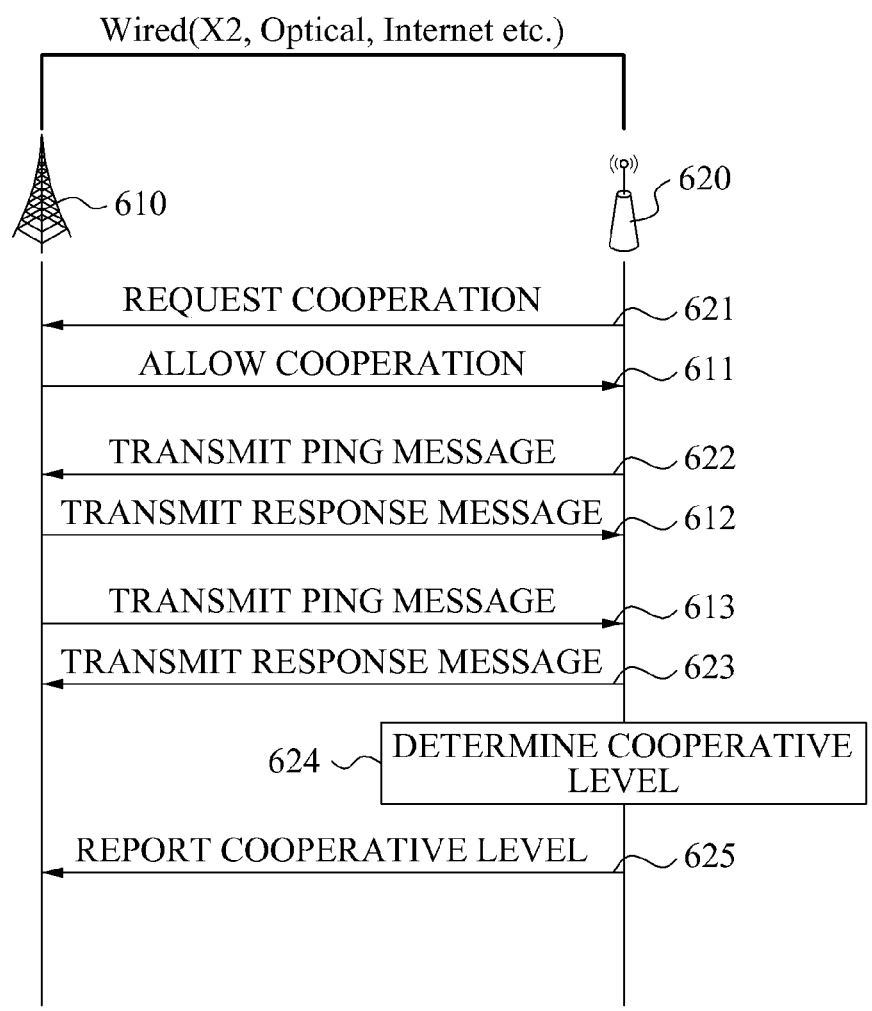
FIG. 6 is a flowchart illustrating an example of a method of determining a cooperative level between base stations.

FIG. 6 illustrates an example of a method of determining a cooperative level between base stations.

Referring to FIG. 6, a neighbor base station 610 is included in a neighbor cell and a target base station 620 is included in a target cell. For example, the target base station 620 and the neighbor base station 610 may be connected via an X2 interface, an optical line, the Internet, and the like.

In 621 the target base station 620 transmits a message requesting cooperation to the neighbor base station 610. When an allow message with respect to the request for cooperation is received from the neighbor base station 610, in 611, the target base station 620 transmits a Ping message to the neighbor base station 610, in 622. The neighbor base station 610 transmits, to the target base station 620, a response message in response to the Ping message received from the target base station 620, in 612.

The neighbor base station 610 transmits a new Ping message to the target base station 620, in 613. The target base station 620 transmits, to the neighbor base station 610, a response message in response to the Ping message received from the neighbor base station 610, in 623.

The target base station 620 may measure information associated with a connection state between the target base station 620 and the neighbor base station 610 during a Ping message exchanging process. For example, the information associated with the connection state may be an available bandwidth, a data transmission rate, delay, a jitter, and the like, between the target base station 620 and the neighbor base station 610. The target base station 620 may determine the cooperative level based on the measured information associated with the connection state, in 624.

In 625 the target base station 620 may report the determined cooperative level to the neighbor base station 610.

Figure 7:
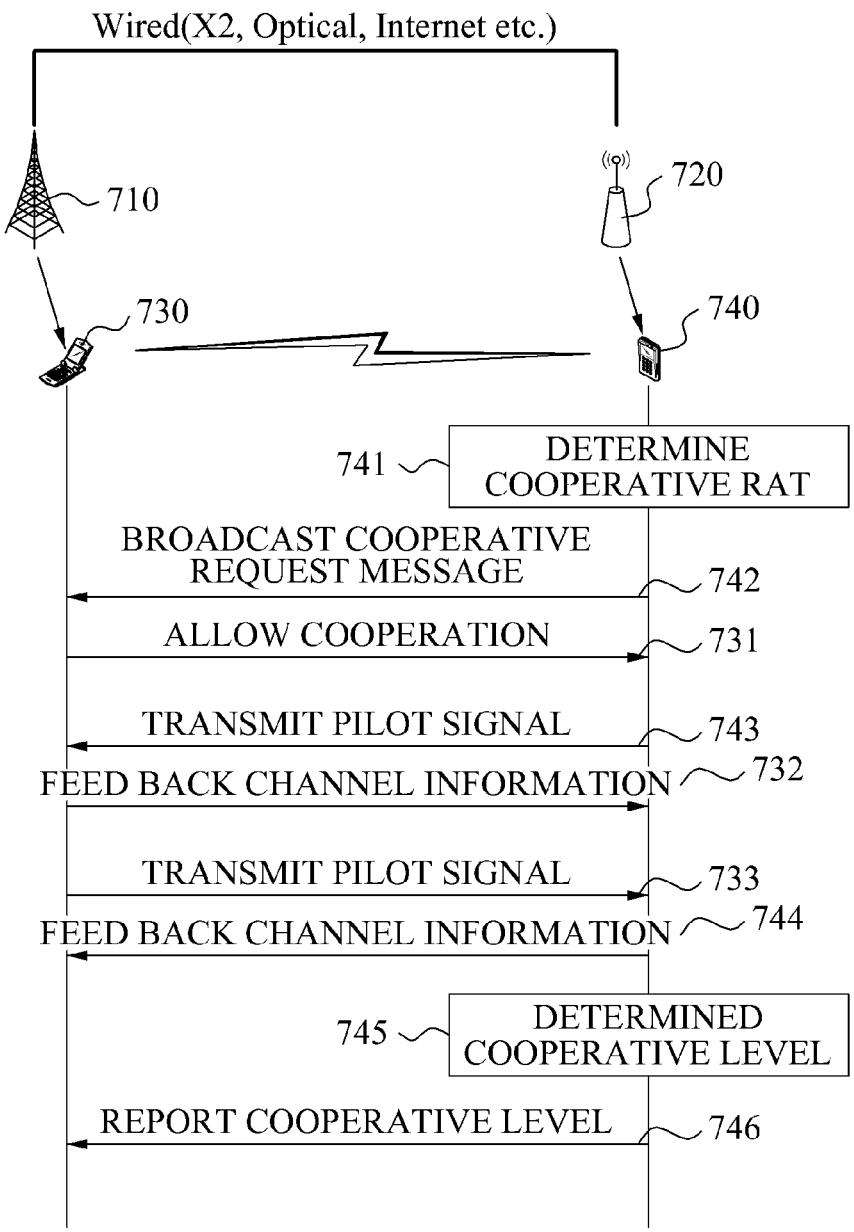
FIG. 7 is a diagram illustrating an example of a method of determining a cooperative level between terminals.

FIG. 7 illustrates an example of a method of determining a cooperative level between terminals.

Referring to FIG. 7, a neighbor base station 710 and a neighbor terminal 730 are included in a neighbor cell, and a target base station 720 and a target terminal 740 are included in a target cell. For example, the target base station 720 and the neighbor base station 710 may be connected via a wired connection, such as an X2 interface, an optical line, the Internet, and the like. For example, the target terminal 740 and the neighbor terminal 730 may be connected via a wireless connection, such as a Bluetooth scheme, a Zigbee scheme, a Wi-Fi scheme, and the like.

In 741 the target terminal 740 determines a radio access technology (RAT) to be used for requesting the cooperation from among RATs of the target terminal 740.

The target terminal 740 broadcasts a cooperation request message based on the determined RAT, in 742, and receives a cooperation allow message from the neighbor terminal 730 that is available, in 731. For example, the process of determining the cooperative RAT and the process of requesting and allowing the cooperation may be performed via the wired connected between the target base station 720 and the neighbor base station 710.

The target terminal 740 transmits a pilot signal to the neighbor terminal 730, in 743. The neighbor terminal 730 receives the pilot signal, estimates channel information, and feeds back the estimated channel information to the target terminal 740, in 732.

In the same manner, the neighbor terminal 730 also transmits a pilot signal to the target terminal 740, in 733. The target terminal 740 receives the pilot signal, estimates channel information, and feeds back the estimated channel information to the neighbor terminal 730, in 744.

The target terminal 740 determines a cooperative level based on the channel information obtained during the pilot signal exchanging process, in 745, and reports the determined cooperative level to the neighbor terminal 730, in 746.

As described above, the interference channel modeling may determine a method to be used for transforming a recognized interference channel model into a simple interference channel model.

Figure 8:
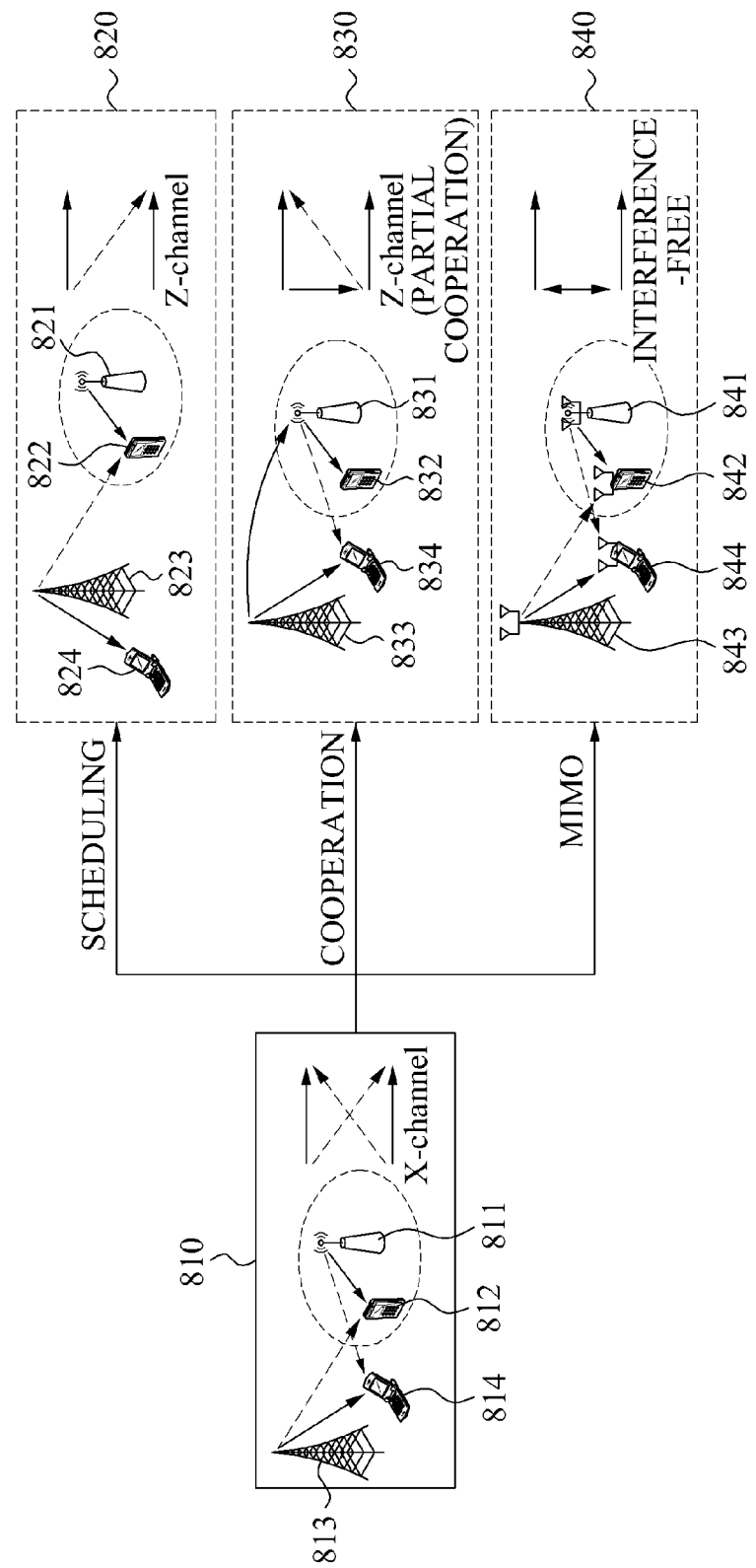
FIG. 8 is a diagram illustrating an example of a process of interference channel modeling based on each method.

FIG. 8 illustrates an example of a process of interference channel modeling based on each method.

Referring to FIG. 8, there are three schemes of simplifying an interference channel, a scheduling scheme, a cooperation scheme, and a MIMO scheme. The interference channel modeling may select a method including at least one of the schemes to be used for simplifying a current interference channel from among the schemes.

Region 810 represents a recognized interference channel model. In this example, a neighbor base station 813 and a neighbor terminal 814 are included in a neighbor cell, and a target base station 811 and a target terminal 812 are included in a target cell. Region 810 is in a condition in which interference between the target base station 811 and the neighbor terminal 814, and interference between the neighbor base station 813 and the target terminal 812 occur.

Region 820 represents an example in which the scheduling scheme is applied to the interference condition in region 810. The scheduling scheme may select a terminal in a region affected by relatively weak interference, and may adjust a transmission power to reduce interference. In this example, a neighbor base station 823 may select a neighbor terminal 824 that is farther away from the target cell, and thus, may reduce interference between a target base station 821 and a neighbor terminal 824. However, interference from the neighbor base station 823 to a target terminal 822 may remain.

Region 830 represents an example in which the cooperation scheme is applied to the interference condition of the region 810. The cooperation scheme may exchange data or channel information between base stations or between terminals to cancel or reduce interference. A neighbor base station 833 may report, to a target base station 831, data to be transmitted to a neighbor terminal 834. The target base station 831 may transmit, based on the report, data to a target terminal 832, and thus, may cancel or reduce interference to the target terminal 832 from the neighbor base station 833. When the cooperation scheme is applied, the scheduling scheme may also be applied.

Region 840 represents an example in which the MIMO scheme is applied to the interference condition in region 810. For example, the MIMO scheme may align interference to be in one direction in a spatial domain. The MIMO scheme may cancel or reduce interference to a neighbor terminal 844 from a target base station 841 and interference to a target terminal 842 from a neighbor base station 843. When the MIMO scheme is applied, the scheduling scheme and/or the cooperation scheme may also be applied.

For example, a MIMO scheme to reduce or cancel interference may be applied and a scheduling scheme and/or a cooperation scheme may also be applied to reduce or cancel interference. As another example, a scheduling scheme may be applied to reduce or cancel interference and a MIMO scheme and/or a cooperation scheme may also be applied to reduce or cancel interference. As another example, a cooperation scheme may be applied to reduce or cancel interference and a MIMO scheme and/or a scheduling scheme may also be applied to reduce or cancel interference. It should be appreciated that the schemes may be applied simultaneously or at different times.

The target base station may select a method including at least one of the schemes to perform interference channel modeling. For example, the target base station may select the method based on an overhead. The overhead may be a resource expended for transmitting additional information used for transmitting data, and may include a downlink overhead, an uplink overhead, and/or information exchange overhead between base stations. For example, the downlink overhead may be associated with a pilot or control information, the uplink overhead may be associated with uplink feedback information, and the information exchange overhead between base stations may be associated with information exchanged between base stations. Accordingly, a total overhead may be determined based on the three overheads as below.

$$\text{Total overhead} = (a * \text{downlink overhead}) + (b * \text{uplink overhead}) + (c * \text{information exchange overhead between base stations}).$$

In this example, $a+b+c=1$. An overhead for each of the scheduling scheme, the cooperation scheme, the MIMO scheme, and any combination thereof may be calculated, and a case may be selected, for example, a case causing the smallest amount of overhead or a case having the highest transmission rate per overhead may be selected. The selected method may be effective to design a communication system to have performance greater than or equal to a predetermined level, rather than to design a system to completely cancel interference.

After the interference channel modeling is performed, the base station may perform an operation of applying an interference control algorithm. The operation of applying the interference control algorithm may cancel or reduce interference through an interference control algorithm corresponding to the scheme selected during the interference channel modeling. For example, when only the scheduling scheme is determined to be used, non-cooperation-based fractional frequency reuse (FFR) may be an available interference control algorithm.

As another example, when the cooperation scheme is determined to be used, examples of available interference algorithm may include a JP scheme and a CB scheme. In this example, the scheduling scheme may be accompanied by the cooperation scheme. Also, the algorithms may be classified based on a type of information shared between base stations. A receiving end cooperation-based algorithm may also be available.

As another example, when the MIMO scheme is determined to be used, a representative example of an available interference control algorithm may be a zero-forcing beamforming (ZFBF) scheme. In this example, the scheduling scheme or the cooperation scheme may be accompanied by the MIMO scheme. The interference control algorithms used in the operation of applying the interference control algorithm may not be limited to the described examples, and it should be appreciated that various algorithms may be used.

Figure 9:
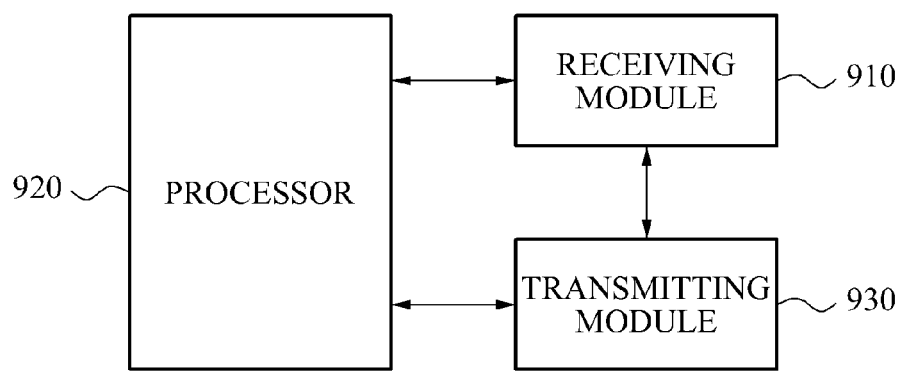
FIG. 9 is a diagram illustrating an example of a terminal.

FIG. 9 illustrates an example of a terminal.

Referring to FIG. 9, the target terminal is capable of performing cognitive inter-cell interference control and includes a receiving module 910, a processor 920, and a transmitting module 930.

The receiving module 910 may receive a pilot transmission request message or an interference signal from a neighbor terminal located in a neighbor cell.

The processor 920 may decode the received signal to determine whether a pilot transmission is requested, and may measure information associated with interference from the neighbor terminal. The processor 920 may generate location information of the target terminal.

The transmitting module 930 may transmit, to the target base station, the location information of the target terminal and the measured information associated with interference from the neighbor terminal in a neighbor cell. Also, the transmitting module 930 may transmit a pilot signal to the target base station.

Figure 10:
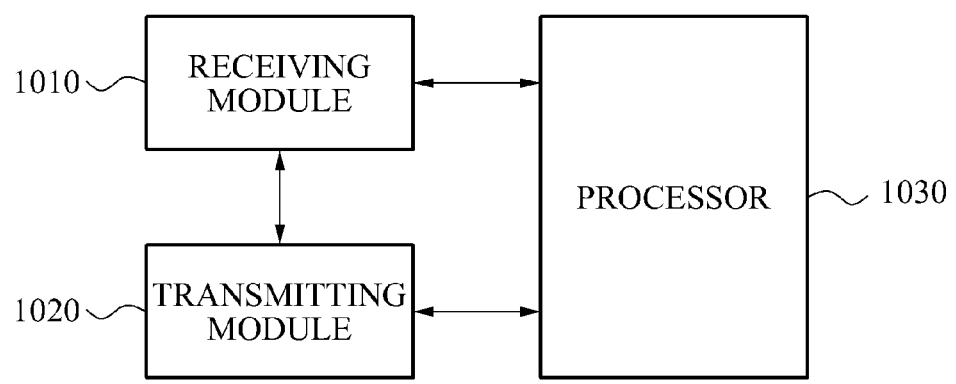
FIG. 10 is a diagram illustrating an example of a base station.

FIG. 10 illustrates an example of a base station.

Referring to FIG. 10, the target base station is capable of performing cognitive inter-cell interference control and includes a receiving module 1010, a transmitting module 1020, and a processor 1030.

The receiving module 1010 may receive a pilot signal from a neighbor terminal in a neighbor cell or may receive, from a target terminal, information associated with interference between the target terminal and the neighbor terminal in the neighbor cell. For example, the receiving module 1010 may directly receive an interference signal from the neighbor terminal in the neighbor cell. As another example, the receiving module 1010 may receive, from the neighbor base station in the neighbor cell, a message requesting to command a target terminal to transmit a pilot signal. Also, the receiving module 1010 may receive a pilot signal from the neighbor terminal.

The processor 1030 may predict interference to the neighbor terminal in the neighbor cell from the target base station, based on information associated with interference received from at least one target terminal and/or location information associated with at least one terminal. The processor 1030 may measure interference from the neighbor terminal. The processor 1030 may decode a pilot signal of the neighbor terminal to estimate an interference channel. The processor 1030 may determine whether pilot transmission is requested by the neighbor base station, and may generate a message commending the target terminal to transmit the pilot signal. The processor 1030 may perform interference channel modeling and may apply an interference control algorithm.

The transmission module 1020 may transmit a pilot transmission request message to the neighbor base station or to the neighbor terminal.

A target terminal and a target base station performing cognitive inter-cell interference control have been described. The examples described with reference to FIGS. 1 through 8 are also applicable to the target terminal and the target base station shown in FIGS. 9 and 10.

According to various examples, existence of a neighbor terminal included in a neighbor cell and interference from the neighbor terminal may be predicted based on location information of target terminals and information associated with interference from the neighbor terminal in the neighbor cell. The information may be measured by the target terminals included in a target cell.

According to various examples, a target base station may request pilot transmission from a neighbor base station in a neighbor cell, and the neighbor base station may command a neighbor terminal in the neighbor cell to transmit a pilot signal. Accordingly, the target base station may receive the pilot signal from the neighbor terminal to recognize an interference channel.

According to various examples, a target base station may directly request, from a neighbor terminal in a neighbor cell, pilot transmission, and may receive a pilot signal to recognize an interference channel.

According to various examples, an interference channel may be recognized based on various methods, and an optimal interference control algorithm may be applied to an interference channel environment by modeling the interference channel, and thus, interference may be controlled and may be cancelled or reduced. As a result, a data transmission rate may increase, and a total cell capacity may increase.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method for a target base station in a target cell in a multi-cell communication system including the target cell and a neighbor cell, the method comprising:
    receiving, from at least one terminal in the target cell, information associated with interference from a neighbor terminal in the neighbor cell to the at least one terminal in the target cell, and location information of the at least one terminal;
    predicting interference from the target base station to the neighbor terminal based on the received information associated with the interference from the neighbor terminal to the at least one terminal and based on the location information of the at least one terminal; and
    performing interference control based on the predicted interference from the target base station to the neighbor terminal.

2. The method of claim 1, wherein the information associated with the interference from the neighbor terminal to the at least one terminal includes at least one of a received signal strength (RSS) and an interference-to-noise-ratio (INR).

3. The method of claim 1, further comprising:
    determining a cooperative level between a neighbor base station in the neighbor cell and the target base station based on at least one of information associated with an available bandwidth, a data transmission rate, a delay, and a jitter between the neighbor base station and the target base station.

4. The method of claim 1, wherein the performing of the interference control comprises:
    selecting, based on an overhead, a method to be used for the interference control from among methods including at least one of a user scheduling scheme, a cooperation scheme between base stations, and a multiple-input multiple-output (MIMO) scheme.

5. The method of claim 4, further comprising:
    removing interference through an interference control algorithm based on the selected method.

6. A communication method for a target terminal in a target cell in a multi-cell communication system including the target cell and a neighbor cell, the method comprising:
    measuring interference from a neighbor terminal in the neighbor cell to the target terminal; and
    transmitting, to the target base station, information associated with the measured interference and location information of the target terminal, using an uplink resource of the target terminal;
    wherein interference from the target base station to the neighbor terminal is predicted by the target base station, based on information associated with the measured interference and the location information of the at least one terminal.

7. The method of claim 6, wherein the measuring comprises:
    measuring the interference when the target terminal does not perform uplink transmission in an uplink channel of the target terminal.

8. The method of claim 6, wherein the measuring comprises:
    measuring at least one of an RSS and an INR.

9. The method of claim 6, wherein the measuring comprises:
    receiving a pilot signal from the neighbor terminal in the neighbor cell and estimating channel state information (CSI) from the neighbor terminal to the target terminal.

* * * * *